United States Patent
Kawamoto

(10) Patent No.: US 7,646,504 B2
(45) Date of Patent: Jan. 12, 2010

(54) IMAGE DATA PROCESSING DEVICE, IMAGE PROCESSING DEVICE, IMAGE FORMING DEVICE, AND IMAGE TRANSMITTING SYSTEM

(75) Inventor: Hiroyuki Kawamoto, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 500 days.

(21) Appl. No.: 11/276,631

(22) Filed: Mar. 8, 2006

(65) Prior Publication Data

US 2006/0221415 A1    Oct. 5, 2006

(30) Foreign Application Priority Data

Mar. 16, 2005    (JP)    ............... 2005-075102

(51) Int. Cl.
*H04N 1/40*    (2006.01)
(52) U.S. Cl. ............... 358/1.15; 358/2.1; 358/468
(58) Field of Classification Search ........... 358/1.9, 358/2.1, 1.12, 1.15–1.18, 404, 408, 444, 358/468, 474–475, 505
See application file for complete search history.

(56) References Cited

U.S. PATENT DOCUMENTS 6,426,809 B1    7/2002    Hayashi et al.
6,633,413 B1 *  10/2003   Schlank et al. ............ 358/468
6,643,397 B1    11/2003   Kanamori
2005/0179954 A1  8/2005   Arai et al.

FOREIGN PATENT DOCUMENTS

| EP | 0 475 762 A2 | 3/1992 |
| EP | 1 265 434 A1 | 12/2002 |
| EP | 1 292 110 A2 | 3/2003 |
| JP | 6-205204 | 7/1994 |
| JP | 10-326336 | 12/1998 |
| JP | 2001-285653 | 10/2001 |
| JP | 2001-333282 | 11/2001 |
| JP | 2001-358950 | 12/2001 |
| JP | 2002-099926 | 4/2002 |
| JP | 2004-072166 | 3/2004 |
| JP | 2004-128879 | 4/2004 |
| JP | 2004-357289 | 12/2004 |

* cited by examiner

*Primary Examiner*—Thomas D Lee
*Assistant Examiner*—Stephen M Brinich
(74) *Attorney, Agent, or Firm*—Oblon, Spivak, McClelland, Maier & Neustadt, L.L.P.

(57) ABSTRACT

In an image data processing device, correcting of input color image data, converting the input data to monochrome image, and judging whether the image expressed by the input color image data is a color image or a monochrome image, are all performed simultaneously; the corrected color image data and the converted monochrome image data are stored; and based on the judgment, any one of the color image data and the monochrome image data stored are transmitted to an external device via a communicating unit.

8 Claims, 14 Drawing Sheets

IMAGE DATA PROCESSING DEVICE, IMAGE PROCESSING DEVICE, IMAGE FORMING DEVICE, AND IMAGE TRANSMITTING SYSTEM

CROSS-REFERENCE TO RELATED APPLICATIONS

The present document incorporates by reference the entire contents of Japanese priority document, 2005-075102 filed in Japan on Mar. 16, 2005.

BACKGROUND OF THE INVENTION

1. Field of the Invention

The present invention relates to a technology in which an image taken, for example, by a digital camera or a color document scanner is transmitted after color correction, via a communications medium to an external device, such as a computer, server, network printer, network copier, or facsimile.

2. Description of the Related Art

Japanese Published Unexamined Patent Application No. H6-205204 discloses an image processing device that uses a color document scanner to prescan and read a document, judges an image type, such as monochrome/color or dot photograph/silver halide photograph, based on image data, stores the judgment result, and, in a final scan, subjects image data to a color correcting process determined as being suited to the image type based on the judgment result. When transmitting image data, read from a document image, to a computer, etc., a long time is required to transmit the image to the computer and operator working efficiency is low because a prescan and a final scan are performed.

Japanese Published Unexamined Patent Application No. 2001-285653 discloses an image processing device that temporarily stores data read from a document in a memory, then judges a document image type (color/gray scale/binary monochrome), and upon converting the image data in the memory, transmits the data to an external device. Because time for judging the image type and time for subsequently converting the image data according to the judgment result are required in addition to the time for reading the document using a scanner, a long time is required to transmit an image to a computer and operator working efficiency is low in this case as well.

Japanese Published Unexamined Patent Application No. H10-326336 discloses an image processing device that writes R, G, and B image data generated by an image reading device, into a color image file and writes the G data as they are into a gray scale image file. When the reading of an entire document ends, the image processing device performs a base removing process on the image data in the gray scale image file to prepare binary monochrome image data, writes the binary monochrome image data into a monochrome image file, displays an image of the image data in the color image file on a color image display property sheet, displays an image of the image data in the gray scale image file on a gray scale image display property sheet, and displays an image of the image data in the binary monochrome image file on a binary monochrome image display property sheet. However, it is unclear as to the image data (color image data, gray scale image data, or binary monochrome image data) of which image file expresses the document image appropriately. Thus, when image data need to be transmitted to an external device, if an image file of just one type is transmitted to the external device, image data of inappropriate image expression may be transmitted. If the image files of the three types are transmitted to the external device, image processes at the external device become complex and operator working efficiency becomes poor.

Japanese Published Unexamined Patent Application No. 2001-333282 discloses an image processing system in which, for example, a personal computer PC is connected to a facsimile with a scanner function, an image processing device simultaneously executes a color image process and a simplified monochrome image process on image data read from a document, transmits the color image data resulting from the color image process to the PC, and performs facsimile transmission of the image data obtained by the simplified monochrome image process. However, because color image data are transmitted to the PC, color image data of a large data volume may be transmitted to the PC while transmitting a monochrome binary image, and the data processing load of the PC may thus be excessive.

SUMMARY OF THE INVENTION

It is an object of the present invention to at least solve the problems in the conventional technology.

According to an aspect of the present invention, an image data processing device, includes a color processor that performs a color image correcting process on input color image data; a monochrome processor that performs a monochrome image converting process on the input color image data to convert the input color image data to monochrome image data, in parallel with the color image correcting process; a color/monochrome judging unit that judges, in parallel with the color image correcting process, whether an image expressed by the input color image data is a color image or a monochrome image, thereby generating a judgment result; a storage unit that stores the color image data processed by the color processor and the monochrome image data output by the monochrome processor; a communicating unit that sends and receives commands and drawing information to and from an external device; and a transmitting unit that transmits any one of the color image data and the monochrome image data after being stored, to the external device via the communicating unit based on the judgment result of the color/monochrome judging unit.

According to another aspect of the present invention, an image processing device includes an image data processing device as described above; and an image pickup unit that includes an image pickup element, generates color component image data of an image projected onto the image pickup element, and sends the color component image data to the image data processing device.

According to still another aspect of the present invention, an image forming device includes an image data processing device as described above; a printer that can selectively produce on paper, any one of a color image and a monochrome image expressed by any one of color record component image data and monochrome record image data; and a printing processor that converts drawing information, which an external device instructs to be printed, to printer-compatible image data, and outputs the printer-compatible image data to the printer.

According to still another aspect of the present invention, an image forming device includes an image processing device as described above; a printer that can selectively produce on paper, any one of a color image and a monochrome image expressed by any one of color record component image data and monochrome record image data; and a printing processor that converts color component image data, generated by the image pickup unit, and drawing information, which an external device instructs to be printed, to printer-compatible image data and outputs the printer-compatible image data to the printer.

According to still another aspect of the present invention, an image transmitting system includes a multifunction image forming device, including a color document scanner, a storage unit that stores image data, a color printer, a reading correcting unit that applies a reading correction to the image data generated by the color document scanner, an image quality correcting unit that converts the image data after the reading correction, to printer-compatible color image data to be printed out by the color printer, an image data transmitting bus, a control unit that controls flow of the image data from the color document scanner to the reading correcting unit and to the image data transmitting bus, and flow of the image data from the image data transmitting bus to the image quality correcting unit and to the color printer, a communicating unit that communicates with an external device, a read/write controlling unit that controls flow of the image data between the image data transmitting bus and the storage unit and, upon storing drawing information obtained from the external device via the communicating unit in the storage unit, makes the color printer print out the drawing information, and a sending unit that sends the drawing information in the storage unit to the external device via the communicating unit; a communications medium that is any one of a communications line, a telecommunications line, and a network through which the communicating unit communicates with the external device; and the external device that communicates with the multifunction image forming device via the communications medium; and exchanging the drawing information between the external device and the multifunction image forming device; where the external device includes an input unit, using which a user designates an image type from among "color", "auto", and "monochrome", and instructs the multifunction image forming device, via the communications medium, to read and transmit an image of the image type designated by the user; and, in response to the instruction, the multifunction image forming device uses the color document scanner to read a document image, uses the reading correcting unit to perform a color image correcting process on color image data generated by the color document scanner, perform, in parallel to the color image correcting process, a monochrome image converting process on the color image data generated by the color image scanner to convert the color image data to monochrome image data, and judge, in parallel to the color image correcting process, whether an image expressed by the color image data generated by the color document scanner is a color image or a monochrome image, uses the read/write controlling unit to store the color image data, resulting from the color image correcting process, and the monochrome image data, resulting from the monochrome image converting process, in the storage unit, and after storing, transmits the color image data stored in the storage unit to the external device via the communicating unit if the designated image type is "color", transmits the monochrome image data stored in the storage unit to the external device if the designated image type is "monochrome", and if the designated image type is "auto", transmits the color image data to the external device if the color/monochrome judgment result is "color" and transmits the monochrome image data to the external device if the judgment result is "monochrome".

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to accompanying drawings.

First Embodiment

Figure 1:
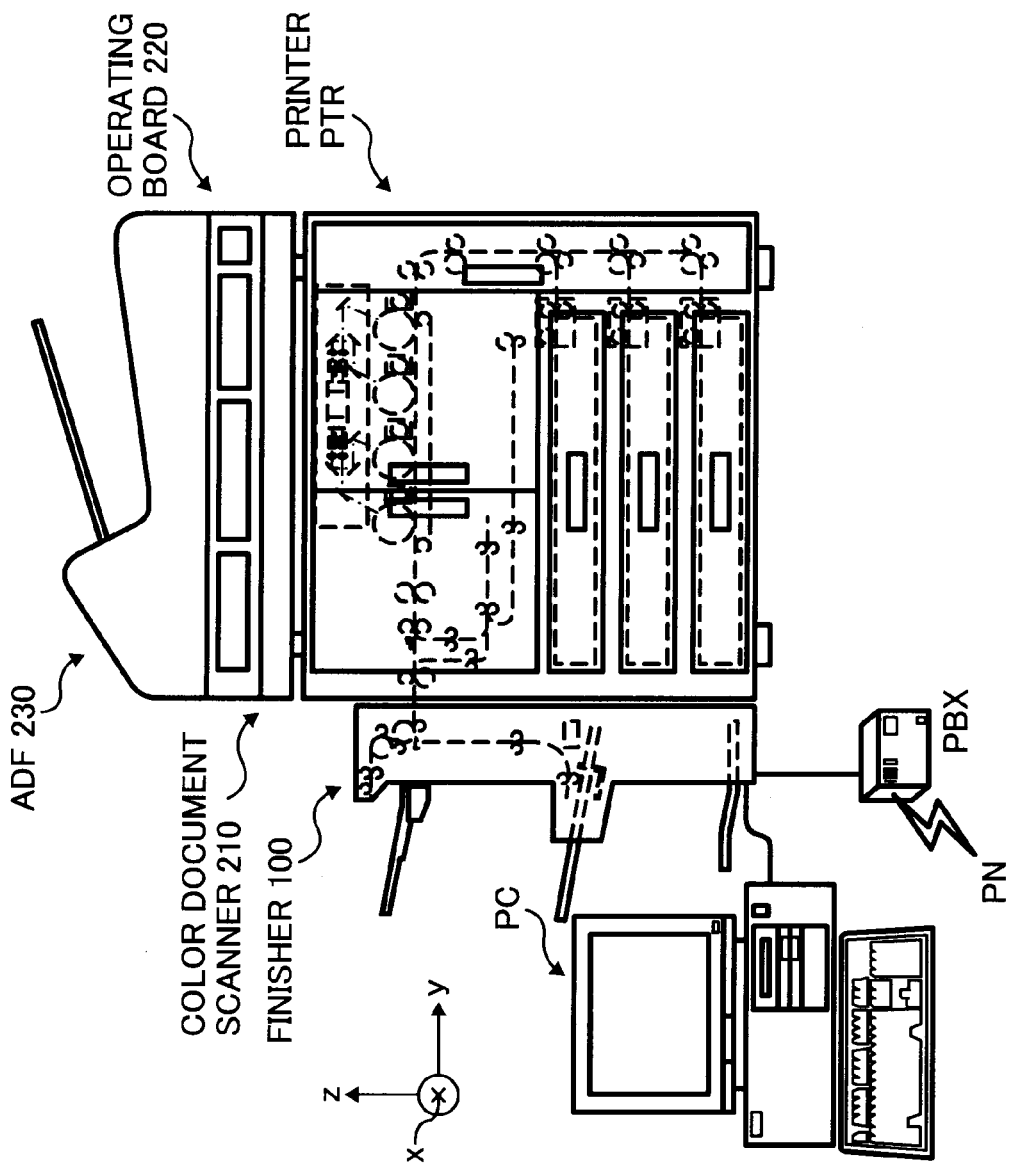
FIG. 1 is an enlarged front view of an outer appearance of a full-color copier with multiple image processing functions according to a first embodiment of the present invention.
Figure 4:
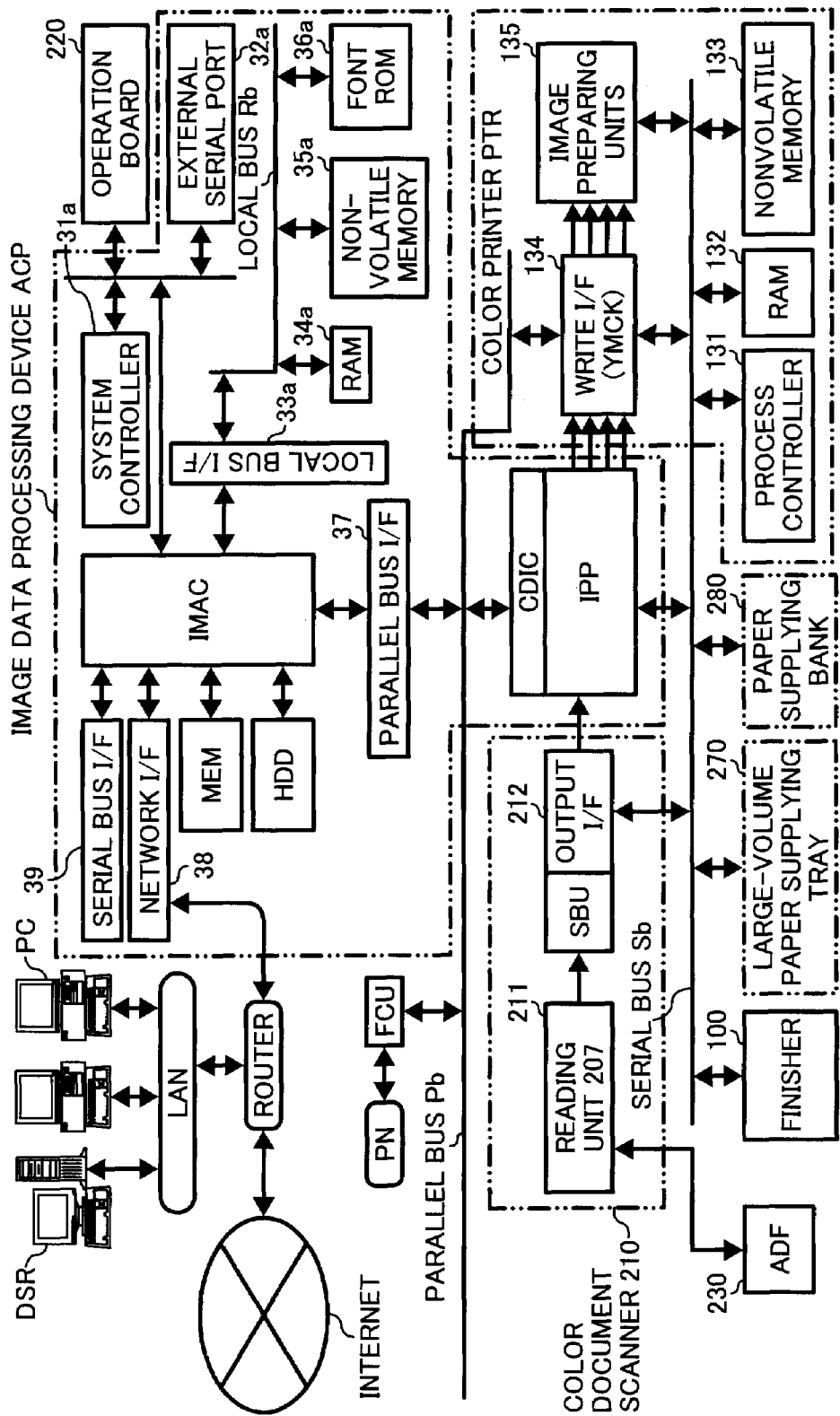
FIG. 4 is a block diagram of an image processing system inside the copier shown in FIG. 1.

FIG. 1 is a diagram of a multifunction full-color digital copier according to a first embodiment of the present invention. The full-color copier includes an automatic document feeder (ADF) 230, an operating board 220, a color scanner 210, a color printer PTR, and a finisher 100. The color scanner 210, provided with the operating board 220 and the ADF 230, and the finisher 100 are units that are separable from the printer PTR. The color scanner 210 has motorized device drivers, sensor inputs, and controlling boards with controllers and performs reading of document images while being controlled in timing by communication with an image data processing device ACP (FIG. 4). A personal computer PC is connected to the image data processing device ACP (FIG. 4) via a LAN (Local Area Network). A facsimile controlling unit FCU (FIG. 4) is connected to a branch exchange PBX that is connected to a telephone line PN (facsimile communications line). Paper that has been printed on by the color printer PTR is discharged to the finisher 100.

Figure 2:
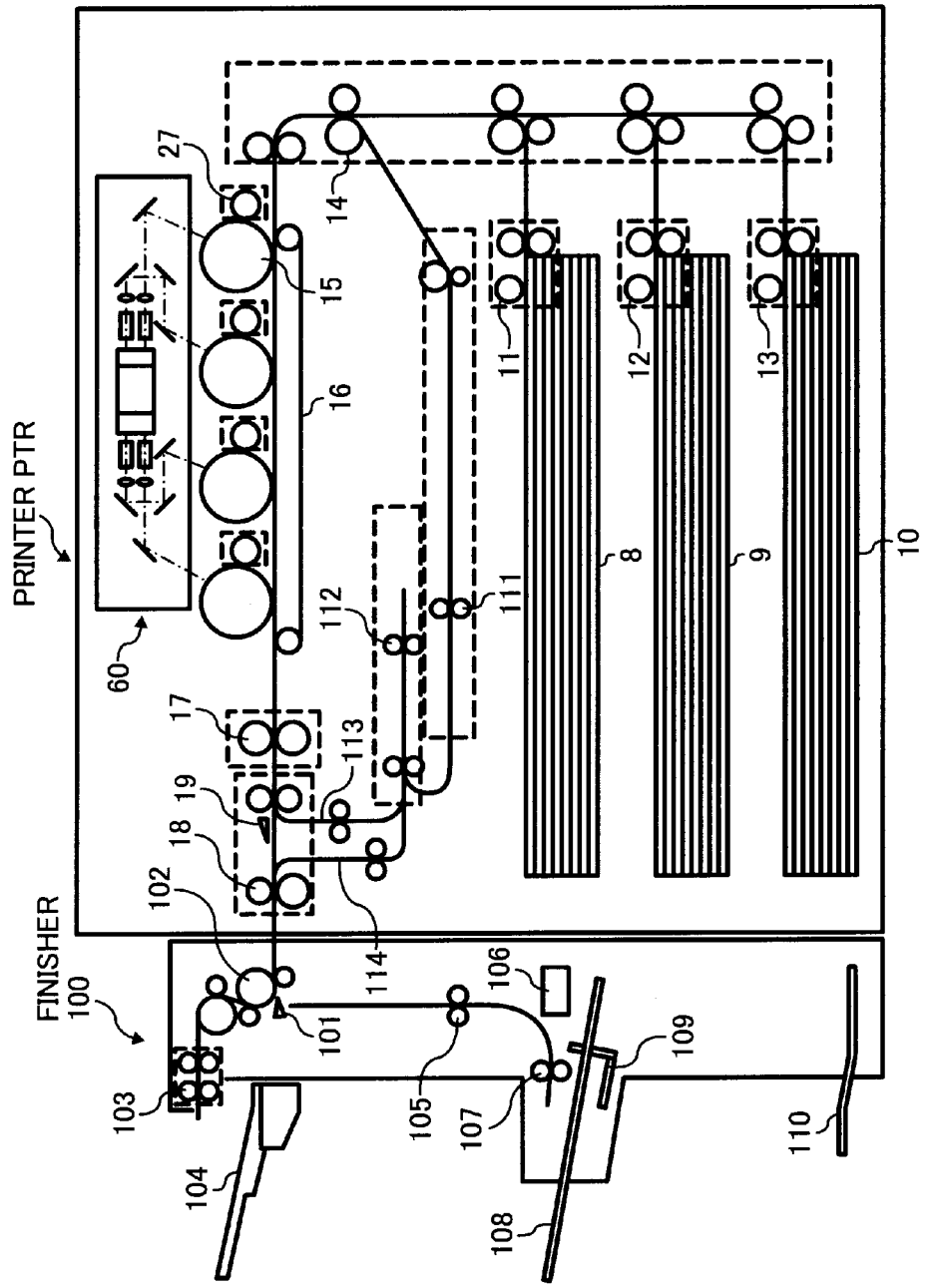
FIG. 2 is an enlarged longitudinal sectional view of a color printer shown in FIG. 1.

FIG. 2 is a sectional view of the color printer PTR. The color printer PTR of this embodiment is a laser printer. A total of four assemblies (image preparing units), each forming a toner image of a single color and including a photoconductor 15, a developing unit 27, as well as a charger, a cleaning device, and a transferring device that are not shown, are provided respectively for image preparation in Bk (black), C (cyan), M (magenta), and Y (yellow) and aligned in tandem along a conveyor belt 16. The toner images of the respective colors formed by these image preparing units are transferred successively and overlappingly onto a single sheet of transfer paper.

A transfer paper, loaded in a first tray 8, a second tray 9, or a third tray 10, is fed by a corresponding feeder among a first paper feeder 11, a second paper feeder 12, and a third paper feeder 13, and conveyed by a longitudinal conveying unit 14 to a position at which the paper contacts the photoconductor 15. Image data, read by the scanner 210, are written by laser exposure by a writing unit 60 onto the photoconductor 15 that has been charged uniformly by a charger (not shown), thereby forming an electrostatic latent image. By the electrostatic latent image passing through the developing unit 27, a toner image is formed on the photoconductor 15. The toner image on the photoconductor 15 is transferred onto the transfer paper as the paper is conveyed by the conveyor belt 16 at the same speed as the rotation of photoconductor 15. Thereafter, the image is fixed at a fixing unit 17 and the paper is discharged by a paper discharging unit 18 to the finisher 100, which is a post-processing device.

The finisher 100, which is the post-processing device shown in FIG. 2, can guide the transfer paper, conveyed by the paper discharging unit 18 of the main unit, in a direction of a normal paper discharging roller 103 or in a direction of a stapling unit. By switching of a switching plate 101 in an upward direction, the paper can be discharged via a paper discharging roller 103 toward a normal paper discharging tray 104. By switching of the switching plate 101 in a downward direction, the transfer paper can be conveyed via conveying rollers 105 and 107 to a stapling deck 108. Each time a transfer paper is discharged onto the stapling deck 108, the edges of the transfer papers loaded on the stapling deck are aligned by a paper aligning jogger 109, and when a set of document copies is completed, the transfer papers are stapled together by a stapler 106. The set of transfer papers, stapled together by the stapler 106, drops by its own weight and is housed in a stapled paper discharging tray 110.

Meanwhile, the normal paper discharging tray 104 is a discharging tray that is movable back and forth (in directions perpendicular to the paper surface as shown in FIG. 2). The normal paper discharging tray 104 that is movable back and forth moves back and forth according to each document or each copy sorted by an image memory and thereby performs simplified sorting of discharged copy papers.

When images are to be formed on both sides of a transfer paper, the transfer paper, supplied from any of the paper trays 8 to 10 and subject to image preparation, is not guided towards the paper discharging tray 104 but is guided once to an inverting unit 112 by the turning downward of a branching claw 19 for switching paths and is stocked in a double-sided paper feeding unit 111.

Thereafter, to transfer a toner image formed on the photoconductor 15 again, the transfer paper stocked in the double-sided paper feeding unit 111 is re-fed from the double-sided paper feeding unit 111 and then guided to the paper discharging tray 104 by the returning of the branching claw 19 for switching paths to the horizontal position in the diagram. The inverting unit 112 and the double-sided paper feeding unit 111 are thus used to prepare images on both sides of a transfer paper.

The photoconductor 15, the conveyor belt 16, the fixing unit 17, the paper discharging unit 18, and the developing unit 27 are driven by a main motor (not shown), and each of paper feeders 11 to 13 is driven by transmission of the driving force of the main motor by a corresponding paper feeder clutch (not shown). The longitudinal conveying unit 14 is driven by transmission of the driving force of the main motor by an intermediate clutch (not shown).

Figure 3:
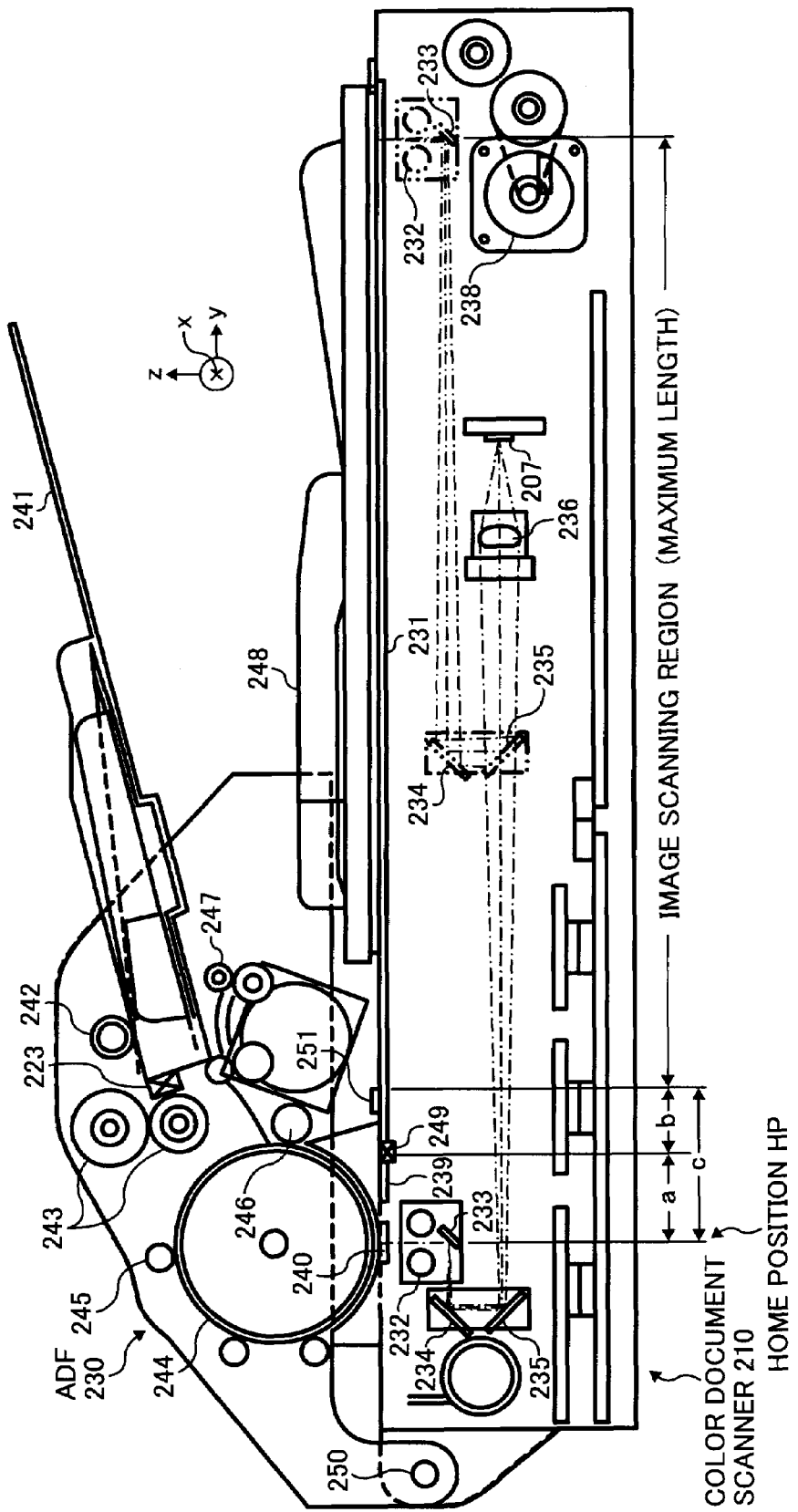
FIG. 3 is an enlarged longitudinal sectional view of a color document scanner and an ADF shown in FIG. 1.

FIG. 3 is a diagram of a document image reading mechanism of the scanner 210 and the ADF 230 installed therein. A document placed on a contact glass 231 of the scanner 210 is illuminated by an illuminating lamp 232 and reflected light (image light) from the document is reflected parallel to a subscan direction y by a first mirror 233. The illuminating lamp 232 and the first mirror 233 are installed on a first carriage (not shown) that is driven at a fixed speed in the subscan direction y. A second mirror 234 and a third mirror 235 are installed on a second carriage (not shown) that is driven in the same direction as but at half the speed of the first carriage, and the image light reflected by the first mirror 233 is reflected in a downward direction (z) by the second mirror 234, then reflected in the subscan direction y by the third mirror 235, converged by a lens 236, and converted into electrical signals upon being illuminated on a CCD 207. The first and the second carriages are driven forth (document scanning) and back (return) along the y-direction by a carrier motor 238 as the driving source.

The scanner 210 is thus a flat-head type document scanner that scans the document on the contact glass 231 by means of the illuminating lamp and the mirrors and projects the document image onto the CCD 207. To enable sheet-through reading as well, a glass 240, which is a sheet-through reading window, is disposed at a reading field position of the first mirror 233 when the first carriage is stopped at a home position, the automatic document feeder (ADF) 230 is installed above the glass 240, and a conveying drum (platen) 244 of the ADF 230 opposes the glass 240.

A document loaded in a document tray 241 of the ADF 230 is fed between the conveyor drum 244 and a pressing roller 245 by a pickup roller 242 and a resist roller pair 243, is made to pass above the reading glass 240 while being put in close contact with the conveying drum 244, and is discharged by paper discharging rollers 246 and 247 onto a paper discharging tray 248 that serves in common as a lower pressing plate of the document tray 241.

In passing by the reading glass 240, which is a document reading window, an image on the surface of the document is illuminated by the illuminating lamp 232 that moves immediately below and, via the optical system of the first mirror 233 and onward, the reflected light from the surface of the document is illuminated on and photoelectrically converted by the CCD 207. That is, the reflected light is converted into the respective color image signals of R, G, and B. The surface of the conveying drum 244 is a white back sheet that opposes the reading glass 240 and has a white color that makes it a reference white surface.

A reference white plate 239 and an origin sensor 249 that detects the first carriage are disposed between the reading glass 240 and a document starting end positioning scale 251. The reference white plate 239 is prepared for performing correction (shading correction) of fluctuation of data read from a document of uniform density that occurs due to fluctuation of the emission intensity or fluctuation in the main scan direction of each individual illuminating lamp 232, non-uniformity of the sensitivities of the pixels of the CCD 207, etc.

FIG. 4 is a diagram of an image processing system of the copier shown in FIG. 1. With the system, the color document scanner 210, including a reading unit 211 and an image data output I/F (Interface) 212, is connected to an image data interface controller CDIC (hereinafter, "CDIC") of the image data processing device ACP. The color printer PTR is also connected to the image data processing device ACP. The color printer PTR receives YMCK record image data in a write I/F 134 from an image data processor IPP (Image Processing Processor; hereinafter, "IPP") and performs printing using the image preparing units 135. The image preparing units 135 are those shown in FIG. 2.

The image data processing device ACP (FIG. 4) is connected to a router, the router is connected to a hub (not shown) of a LAN connected to personal computers PC and to a modem (not shown) connected to the Internet, and the image data processing device ACP can thereby communicate with and send and receive image data to and from devices (such as the personal computers PC, servers DSR, printers, scanners, and multifunction copiers) connected to the LAN. Also via the Internet, the image data processing device ACP can communicate with and send and receive image data to and from other devices with Internet communications functions. A distribution server DSR, connected to the hub of the LAN, is a computer that distributes files (mail, images) sent thereto and stored therein to designated or registered addresses (devices connected to the LAN or the Internet).

The image data processing device ACP (hereinafter, "ACP") has a parallel bus Pb, an image memory access controller IMAC (hereinafter, "IMAC"), an image memory MEM (memory module; hereinafter, "MEM"), a hard disk device HDD (hereinafter, "HDD"), a system controller 31a, a RAM 34a, a nonvolatile memory 35a, a font ROM 36a, the CDIC, the IPP, etc. The facsimile controlling unit FCU (hereinafter, "FCU") is connected to the parallel bus Pb. The operating board 220 is connected to the system controller 31a.

RGB image signals generated by the image pickup elements of the CCD 207 of the reading unit 211 of the color document scanner 210 that optically reads a document, is signal processed by a sensor board unit SBU, converted to RGB image data, subject to the shading correction, and output via the output I/F 212 to the CDIC.

In relation to the image data, the CDIC performs data transmission among the output I/F 212, the parallel bus Pb, and the IPP and performs communications between a process controller 131 and the system controller 31a that performs overall control of the ACP. A RAM 132 is used as a working area of the process controller 131, and a nonvolatile memory 133 stores operating programs, etc., of the process controller 131.

Besides the semiconductor memory MEM, the HDD for storing a large quantity of image data is provided. By using the HDD, images can be held permanently without an external power supply. The images of many documents are read by the scanner and stored in the HDD, and many documents provided by the PC can also be stored in the HDD.

The image memory access controller IMAC (hereinafter, "IMAC") has hardware and software equivalent to those of a personal computer, and besides controlling the writing and reading of image data and control data to and from the MEM and the HDD, is set up with a www server (software), an FTP server (software), an SMTP server (software), a DHCP server (software), and other files and servers (software) used to send and receive mail. This software (programs) is stored in the HDD.

The system controller 31a controls operations of the respective components connected to the parallel bus Pb. The RAM 34a is used as a working area of the system controller 31a, and the nonvolatile memory 35a stores an operating program, etc., of the system controller 31a.

The operating board 220 inputs processes to be performed by the ACP. For example, a process type (copying, facsimile transmission, image reading, printing, etc.) and number of sheets to be processed are input. Image data controlling information can also be input.

The IPP performs a scanner gamma correction, a filter process, and other image processes that correct reading distortions on RGB image data, read by the CCD 207 of the scanner 210 and the ADF, and then stores the data in the MEM. When the image data in the MEM are to be printed, the IPP performs color conversion of the RGB signals to YMCK signals and then performs a printer gamma conversion, a gradation conversion, a gradation process, such as a dithering process or an error diffusion process, and other image quality processes on the signals. After image quality processing, the IPP transmits the image data to the writing I/F 134. The writing I/F 134 performs laser control by pulse width and power modulation with respect to the gradation processed signals. Thereafter, the image data are transmitted to the image preparing units 135 and the image preparing units 135 form a reproduction image on a transfer paper.

Based on control by the system controller 31a, the IMAC performs access control of the image data, the MEM, and the HDD, expansion of printing data from a personal computer PC (hereinafter, "PC") connected to the LAN, secondary compression/expansion of image data for effective utilization of the MEM and the HDD, generation of image files using the various servers (software), and the sending and receiving of the image files via the LAN or the Internet.

Image data sent to the IMAC are stored in the MEM or the HDD upon data compression, and the stored image data are read as needed. Image data read for printing are restored to primary compressed data by expansion, returned from the IMAC to the CDIC via the parallel bus Pb, and restored to the original image data by primary expansion at the CDIC. After being transmitted from the CDIC to the IPP, the image data are subject to the image quality processes, output to the writing I/F 134, and formed to a reproduction image on a transfer paper (sheet) by the image preparing units 135. In being sent via the LAN or the Internet, the secondary compressed data are sent, as they are or upon compression by another compressing method of high compatibility with PCs, to the LAN or the Internet via a network I/F 38 and a router.

In the flow of the image data, functions of a digital multi-function product are realized by bus control at the parallel bus Pb and the CDIC. To perform facsimile transmission, the IPP performs processes on image data read by the scanner 210 and the ADF 230 and then transmits the data via the CDIC and the parallel bus Pb to the FCU. The FCU performs data conversion suited to a communications network and then sends the data as facsimile data to the public network PN. To perform facsimile reception, the FCU converts the network data from the public network PN to image data and transmits the image data via the parallel bus Pb and the CDIC to the IPP. Here, the image data are output from the writing I/F 134 without being subject to any special image quality process and formed to a reproduction image on a transfer paper by the image preparing units 135.

When a plurality of jobs are carried out in parallel, that is for example, the image reading function, the copying function, the facsimile transmission and reception functions, and the printer output function operate in parallel, the system controller 31a and the process controller 131 controls the allocation of the usage rights of the reading unit 211, the image preparing units 135, and the parallel bus Pb among the jobs. The process controller 131 controls the flow of image data, and the system controller 31a controls the system as a whole and manages the starting of the respective resources (jobs). A function of the digital multifunction product is selected at the operating board 220, and the processing details of the image reading function, the image data registering function, the copying function, the printing function, the facsimile function, the linked transmission function, etc., are set according to the selection input at the operating board 220.

The system controller 31a and the process controller 131 communicate with each other via the parallel bus Pb, the CDIC, and a serial bus Sb. Specifically, data format conversions, for data and interface of the parallel bus Pb and the serial bus Sb, are performed in the CDIC to perform communications between the system controller 31a and the process controller 131.

Various bus interfaces, such as a parallel bus I/F 37, a serial bus I/F 39, a local bus I/F 33a, and the network I/F 38 are connected to the IMAC. To maintain independence within the ACP as a whole, the system controller 31a is connected to the relevant units via the plurality of types of buses.

The system controller 31a controls the other functional units via the parallel bus Pb. The parallel bus Pb is also used for transmission of image data. The system controller 31a issues an operation controlling command to the IMAC to store image data in the MEM or the HDD. The operation controlling command is sent via the IMAC, the parallel bus I/F 37, and the parallel bus Pb.

In response to the operation controlling command, the image data are sent from the CDIC to the IMAC via the parallel bus Pb and the parallel bus I/F 37. The image data are then stored in the MEM or the HDD under control by the IMAC.

Meanwhile, when called to perform a printer function from a PC, the system controller 31a of the ACP functions as a printer controller and provides the functions of network control and serial bus control. In receiving printing output request data via the network, the IMAC receives the data via the network I/F 38.

When a general-purpose serial bus is connected, the IMAC receives the printing output request data via the serial bus I/F 39. The general-purpose serial bus I/F 39 is compatible with several standards.

The system controller 31a expands the printing output request data to image data. The data are expanded in an area inside the MEM. The font data necessary for expansion are obtained by referencing the font ROM 36a via the local bus I/F 33a and local bus Rb. The local bus Rb connects the system controller 31a to the nonvolatile memory 35a and the RAM 34a.

Besides an external serial port 32a for connection to a PC, the serial bus Sb is also provided with an interface for transmission with respect to the operating board 220, which is an operating unit of the ACP. The interface is not for expanded printing data but is for communicating with the system controller 31a via the IMAC, receiving a process procedure, displaying a system state, etc.

Data are sent and received between the system controller 31a and the MEM, the HDD, and the various buses via the IMAC. Jobs using the MEM and the HDD are subject to consolidated management in the ACP as a whole.

The CDIC receives image data output from the color document scanner 210 (SBU) and outputs the data to the IPP. The IPP performs a "scanner image process" 190 and sends the data to the CDIC. The CDIC performs primary compression of the image data to increase the transmission efficiency in the parallel bus Pb. The compressed image data are sent to the parallel bus Pb. The image data input from the parallel data bus Pb are primary compressed for bus transmission and are expanded at the CDIC. The expanded image data are transmitted to the IPP. The IPP performs the "image quality processes" to convert the RGB image data to YMCK image data and perform conversion to image data Yp, Mp, Cp, and Kp for image output by the printer PTR and outputs the data to the color printer PTR.

The CDIC also has conversion functions for parallel data transmitted by the parallel bus Pb and serial data transmitted by the serial bus Sb. The system controller 31a transmits data to the parallel bus Pb and the process controller 131 transmits data to the serial bus Sb. The CDIC performs parallel/serial data conversions for communications between the system controller 31a and the process controller 131.

Figure 5:
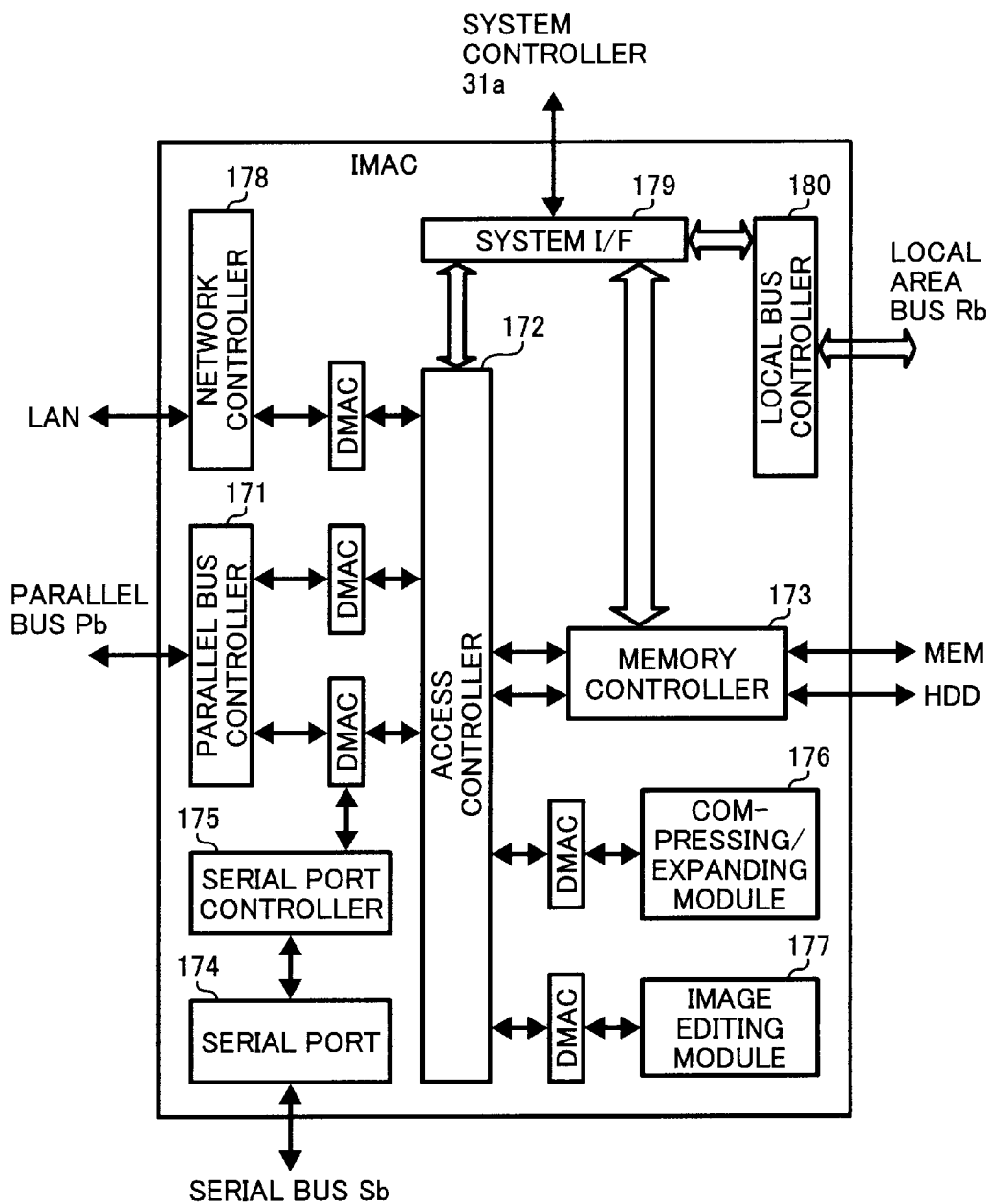
FIG. 5 is a block diagram of an image memory access controller IMAC shown in FIG. 4.

FIG. 5 is a block diagram of the IMAC. The IMAC includes an access controller 172, a memory controller 173, a secondary compressing/expanding module 176, an image editing module 177, a system I/F 179, a local bus controller 180, a parallel bus controller 171, a serial port controller 175, a serial port 174, and a network controller 178. Each of the secondary compressing/expanding module 176, the image editing module 177, the parallel bus controller 171, the serial port controller 175, the network controller 178 is connected to the access controller 172 via a DMAC (Direct Memory Access Controller).

The system I/F 179 sends and receives instructions and data for the system controller 31a. The system controller 31a basically controls the entirety of the ACP. The system controller 31a also manages the allocation of resources among the MEM and the HDD and controls the other units via the system I/F 179, the parallel bus controller 171, and the parallel bus Pb. The respective units of the ACP are basically connected to the parallel bus Pb. The parallel bus controller 171 thus performs exclusive bus control to manage the sending and receiving of data with respect to the system controller 31a, the MEM, and the HDD.

The network controller 178 controls the connection to the LAN and the Internet. The network controller 178 manages the sending and receiving of data with respect to external extension devices connected to the network. That is, the network controller performs sending and receiving of files and mail via the LAN and the Internet based on the www server, the FTP server, the SMTP server, the DHCP server, and other servers used for sending and receiving files and mail and stored (set up) in the HDD. The network controller 178 also generates send files and adds received files to a directory. Though the system controller 31a is not involved in operation management of network connected devices, it performs control concerning the interface in the IMAC. For example, in response to document reading and sending commands from the operating board 220 or a PC, the system controller 31a instructs, to the IMAC, the generation of a send file and the generation and sending of a destination directory.

The serial port 174, connected to the serial bus, has a plurality of ports. The serial port controller 175 has port control mechanisms of a number corresponding to the types of buses made available. Apart from the external serial port, the serial port controller 175 controls the receiving of commands from the operating unit and the sending and receiving of data concerning display. The local bus controller 180 functions as an interface with the local serial bus Rb, to which the RAM 34a, necessary for starting up the system controller 31a, the nonvolatile memory 35a, and the font ROM 36a, for expansion of the printer code data, are connected. The access controller 172 performs command control by the system controller 31a from the system I/F 179. Data control mainly involves the MEM and the HDD and is carried out by managing access of the MEM and the HDD from external units. Image data are transmitted from the CDIC to the IMAC via the parallel bus Pb. The image data are taken into the IMAC at the parallel bus controller 171. Memory access of the image data taken in falls outside the scope of management by the system controller 31a. That is, the memory access is carried out, independently of system control, by the direct memory access controllers (DMAC). In regard to the access of the MEM and the HDD, the access controller 172 mediates access requests from plural units. The memory controller 173 controls MEM and HDD access operations and the writing and reading of data.

When the MEM or the HDD is accessed from the network, the direct memory access controller DMAC transmits data, taken into the IMAC from the network via the network controller 178, to the MEM or the HDD. The access controller 172 mediates the access of the MEM and the HDD by plural jobs. The memory controller 173 performs the reading and writing of data from and to the MEM and the HDD. When the MEM or the HDD is accessed from the serial bus, the direct memory access controller DMAC transmits the data, taken into the IMAC via the serial port 174 by the serial port controller 175, to the MEM or the HDD. The access controller 172 mediates the access of the MEM and the HDD by plural jobs. The memory controller 173 performs the reading and writing of data from and to the MEM and the HDD.

The system controller 31a manages the interface with the respective external units. With regard to transmission of data that have been taken into the IMAC, the respective DMACs shown in FIG. 5 manage memory access. Because each DMAC executes data transmission independently of the other DMACs, the access controller 172 attaches priorities to conflicting jobs or access requests concerning access to the MEM and the HDD.

Besides access by the respective DMACs, the access to the MEM and the HDD also includes access for bitmap expansion of stored data by the system controller 31a via the system I/F 179. DMAC data, for which access to the MEM or the HDD has been allowed by the access controller 172, and data from the system I/F 179 are directly transmitted by the memory controller 173 to the MEM or the HDD.

For internal data processing, the IMAC has the secondary compressing/expanding module 176 and the image editing module 177. The secondary compressing/expanding module 176 performs compression and expansion of data to enable effective storage of image data and code data in the MEM and the HDD. The secondary compressing/expanding module 176 controls the interface with the MEM and the HDD by a DMAC.

Image data that have been stored once in the MEM or the HDD are called from the MEM or the HDD to the secondary compressing/expanding module 176 via the memory controller 173 and the access controller 172 by the direct memory access controller DMAC. The image data subject to data conversion at the secondary compressing/expanding module 176 are then returned to the MEM or the HDD or output to an external bus by the direct memory access controller DMAC.

The image editing module 177 controls the MEM and the HDD by a DMAC and performs data processing in the MEM and the HDD. Specifically, in addition to clearing memory areas, the image editing module 177 performs an image data rotation process, synthesis of different images, and other data processing. The image editing module 177 reads secondary compressed data from the MEM or the HDD, expands the data to primary compressed data by means of the secondary compressing/expanding module 176, and, within the image editing module 177, uses the same decoding logic as a data expansion 163 of the CDIC to expand the primary compressed data to image data in a memory inside the image editing module 177 and processes the expanded data. The processed image data are primary compressed by the same coding logic as a primary compression logic of the CDIC, secondary compressed at the secondary compressing/expanding module 176, and written into the MEM or the HDD.

Figure 6:
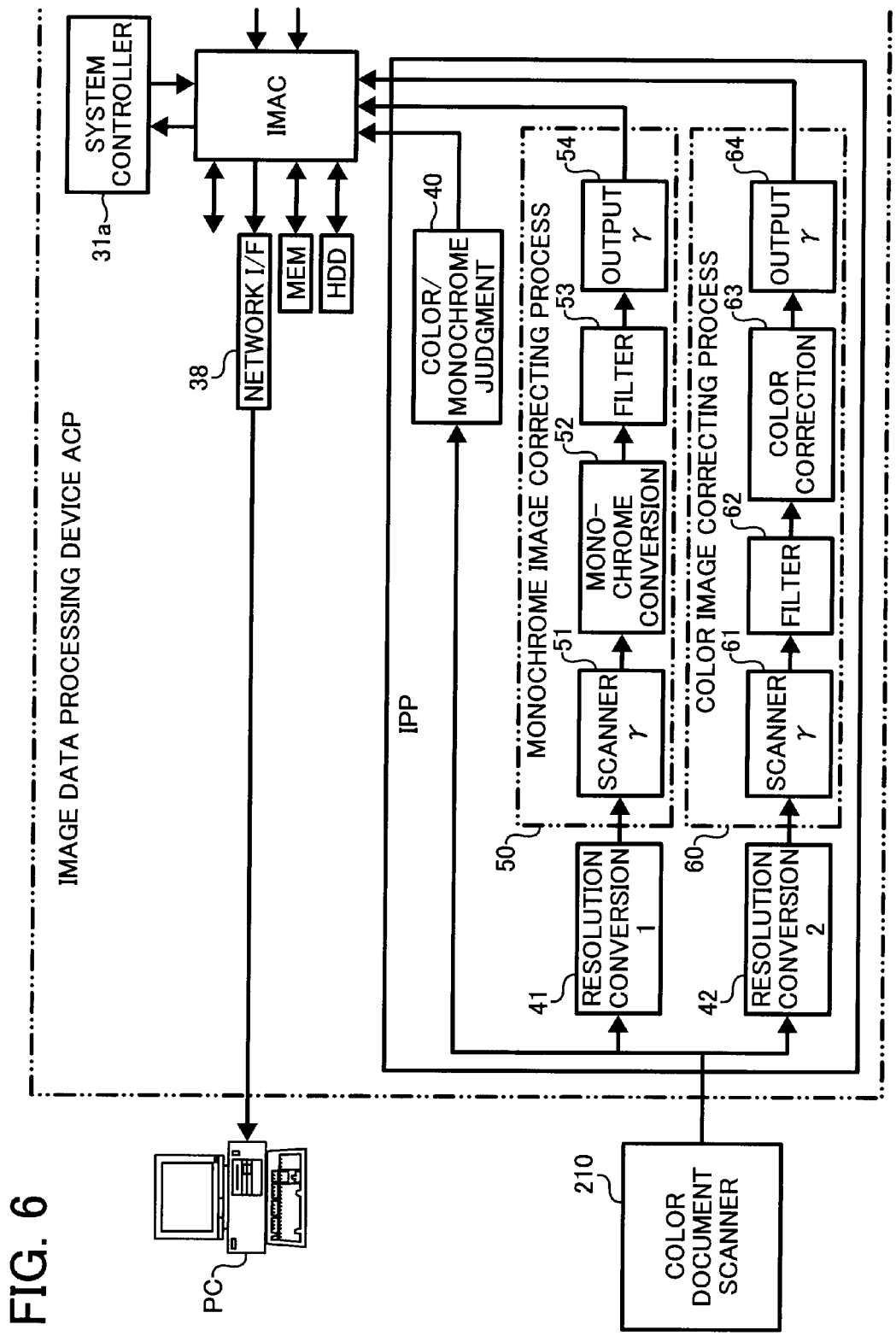
FIG. 6 is a block diagram of scanner image processing functions of an image data processing device shown in FIG. 4.

FIG. 6 illustrates the image data processing functions inside the IPP and a flow of image data in the image data processing device ACP in the case of "image reading and transmission", in which the system controller 31a reads a document image upon starting up the scanner 210 in response to an image reading command from a PC, stores the image data in the HDD via the IMAC, and transmits the data to the PC using the IMAC. Illustrations of the CDIC and the various I/Fs interposed in the image data transmission path have been omitted.

Color decomposed R, G, and B image data that are generated by document reading by the color document scanner 210 are converted in resolution to 300 dpi and 150 dpi by a first resolution conversion 41 and a second resolution conversion 43, respectively, and sent to a monochrome image correcting process 50 and a color image correcting process 60.

In a monochrome image correcting process 50, a scanner γ correction 51 is performed to correct the color component luminance expression of the RGB image data according to the image reading characteristics of the scanner 210 and then a monochrome conversion 52 is performed to convert the RGB image data to monochrome multivalue data (gray scale data) that express the brightness gradation (gray scale) of a single color of black (monochrome). In the monochrome conversion 52, luminance values are determined from the RGB image data by a calculation formula. The brightness gradation variations of the data are then smoothened by a filter process 53, and because the data are image data scheduled to be transferred to a PC at this point, the data are corrected by an output γ correction 54 to image data compatible to gray scale image expression on a display of the PC and then sent to the IMAC. The IMAC generates a gray scale image file in a storage area of the HDD and writes the gray scale image data into the image file.

The color image correcting process 60 uses a scanner γ correction 61 to correct the color component luminance expression of the RGB image, uses a filter process 62 to smoothen the luminance variations, uses a color correcting process 63 to correct the color expression, uses an output γ correction 64 to correct the data to image data compatible to color image expression by the display of the PC, and sends the data to the IMAC. The IMAC generates a color image file in a storage area of the HDD and writes the color image data into the image file.

Each of the scanner γ corrections 51 and 61, which is arranged as an 8-bit input, 8-bit output LUT (look-up table), converts the read data of linear reflectance to data of a fixed γ, such as a fixed lightness. Each of the filter processes 53 and 62 is a spatial filter with a matrix size of 5×5 pixels. The color correcting process 63 may be a linear conversion by a matrix calculation using a 3×3 pixel matrix or may be an LUT. Each of the output γ corrections 54 and 64 is arranged as an LUT. The read image lightness values are changed by changing the contents of the LUTs by a read image lightness changing instruction issued by a user.

The monochrome image correcting process 50 and the color image correcting process 60 are carried out simultaneously to correct the RGB image data, and in parallel to the writing of the gray scale image data and the color image data in the respective image files generated in storage areas of the HDD, whether the image (document image) expressed by the RGB image data is color or monochrome is judged by a color/monochrome judgment.

Figure 7:
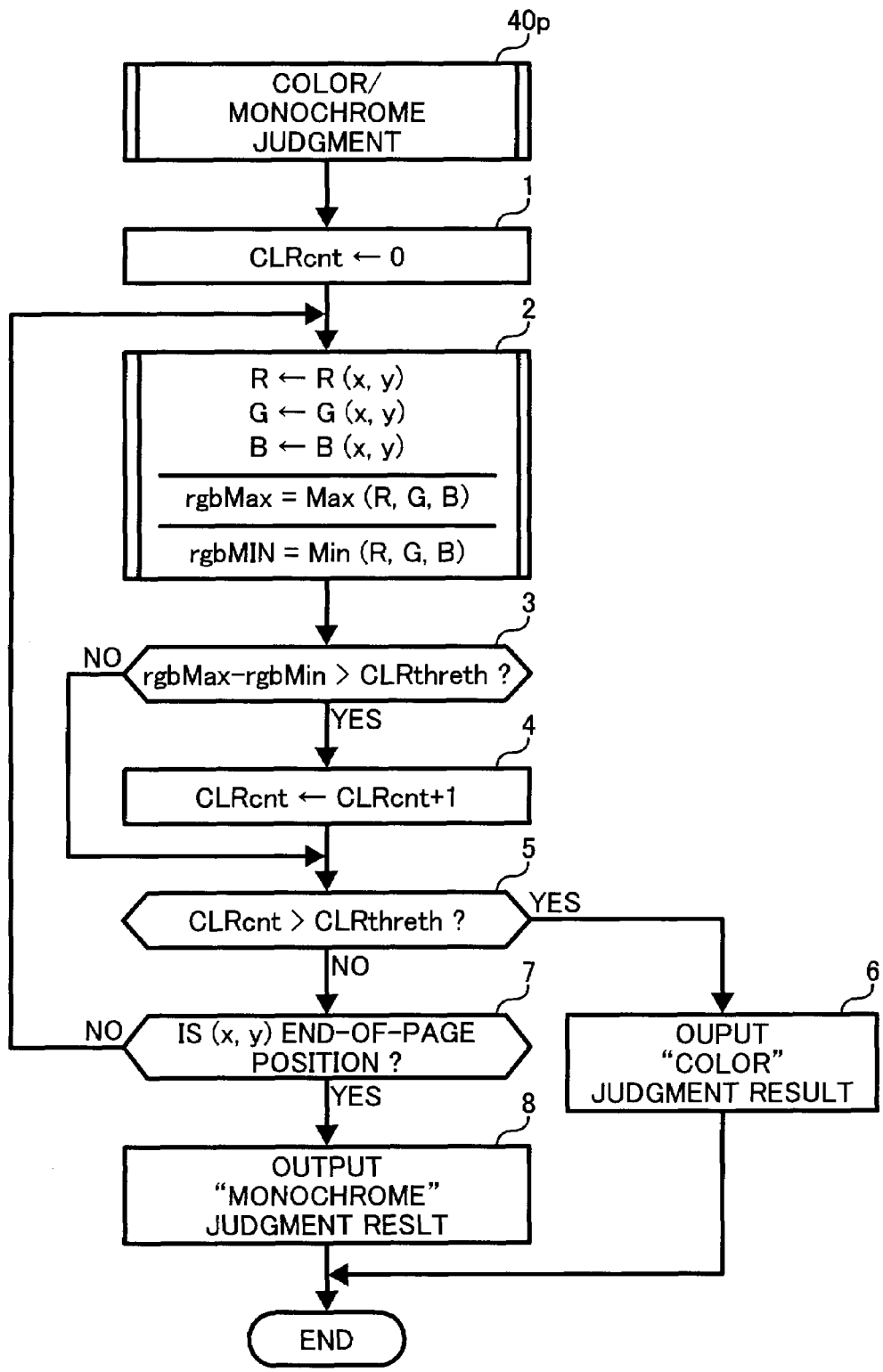
FIG. 7 is a flowchart of a judging process of a color/monochrome judgment shown in FIG. 6.

FIG. 7 is a flowchart of the judging process of the color/monochrome judging unit 40. At the beginning of the reading of an image of a single page, a color judgment count (color pixel number) counting register CLRcnt is initialized (step 1). In the description that follows, the term, "step", shall be omitted and just the numeral or symbol of each step No. shall be indicated. From the beginning of reading of the image of the single page, for each pixel, a maximum value rgbMax and a minimum value rgbMin among the R, G, and B image data are computed (2), a difference between the two values is determined, and if the difference exceeds a threshold value CLRthreth, the pixel is judged to be a color pixel and the data value of the counting register CLRcnt is incremented by one. That is, the count is increased by 1 (3, 4). If the data value of the counting register CLRcnt is greater than a threshold value CLRcntthreth, the image is judged to be a color image, and a judgment result of "color" is output to the system controller 31a (5, 6).

While the data value of the count register CLRcnt is less than or equal to the threshold value CLRcntthreth, judgment of whether a pixel is a color pixel is performed each time the RGB image data (pixel to be judged) is switched. If even the last pixel of the reading of the image of the single page is not judged to be a color pixel and the "color" judgment result is not obtained, a judgment result of "monochrome" is output to the system controller 31a (7, 8).

Each time the reading of a single page of document ends, the system controller 31a stores the "color" or "monochrome" judgment result in the HDD in association with the corresponding page of the image data in the two image files generated in the HDD.

When the reading of documents of the number of sheets (number of pages), set in the color document scanner 210 (including the ADF 230; the same applies hereinafter) by a user, ends, the system controller 31a uses the IMAC to transmit the image data of the respective pages of the image files generated in the storage areas of the HDD to the PC that instructed the image reading. The two files of the gray scale image file and the color image file exists in the storage areas of the HDD at this point. Thus, for each page, the image data of one of the files are selected and transferred to the PC upon attachment and storage of the judgment result in the transmitted file.

Figure 8:
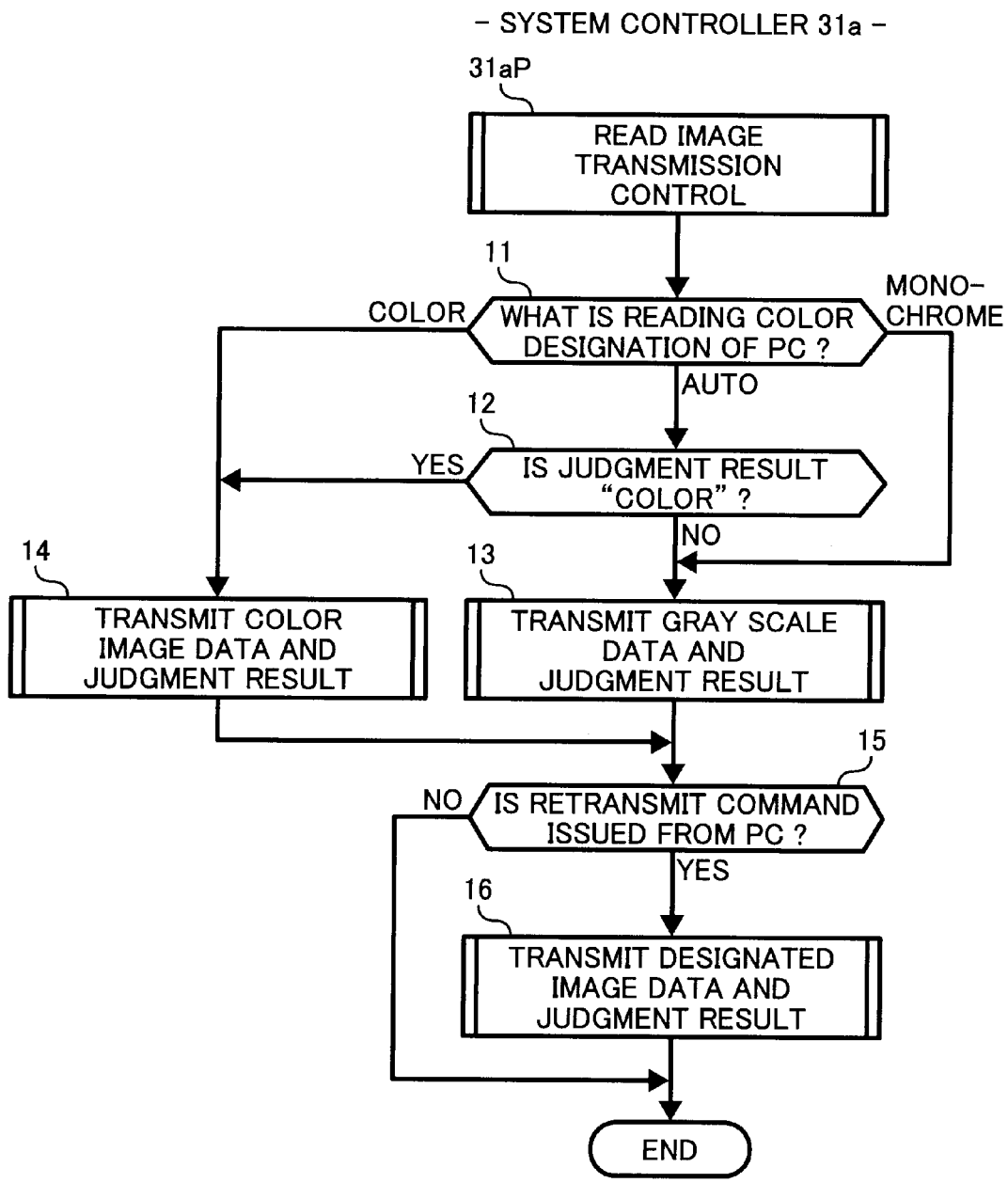
FIG. 8 is a flowchart of transmission control carried out when a system controller shown in FIG. 4 reads an image and performs transmission to a personal computer.

FIG. 8 is a flowchart of an image data (page image) selection logic executed by the system controller 31a. The system controller 31a references a reading mode designation in an "image reading and transmitting command" received initially from a PC, and if the designation is "auto", the system controller 31a references, for each page of the two image files generated in the HDD, the judgment result data stored in correspondence to the page. Then using the IMAC, the system controller 31a extracts the corresponding page from the color image file if the judgment result for the page is "color" or extracts the corresponding page from the gray scale image file if the judgment result for the page is "monochrome", and then, upon attaching the judgment result, stores the page image in the transmission file. Then when the storage of all pages is completed, the system controller 31a transmits the transmission file to the PC (12 to 14).

Because the resolution conversion and the subsequent monochrome image process and color image process are performed in parallel to stored both the gray scale image data and the color image data in the HDD by the above arrangement, there is no need to perform an image process after storage and the image data can be sent immediately.

If the reading mode designation in the "image reading and transmitting command" received initially from the PC is "monochrome", the system controller 31a transmits the image data of each page in the gray scale image file generated in the HDD and transmits the data to the PC upon attaching the judgment result (13 directly from 11). If the reading mode designation in the "image reading and transmitting command" received initially from the PC is "color", the system controller 31a transmits the image data of each page in the color image file generated in the HDD and transmits the data to the PC upon attaching the judgment result (14 directly from 11). If after such transmission, a retransmitting command is received from the same PC without there being any instruction for another task, the system controller 31a transmits to the PC the image data of the corresponding pages in the two image files, stored in the HDD, upon attaching the judgment result according to the reading mode designation contained in the retransmitting command (16). The details of the step 16 are the same as the details of the steps 11 to 14.

Figure 9:
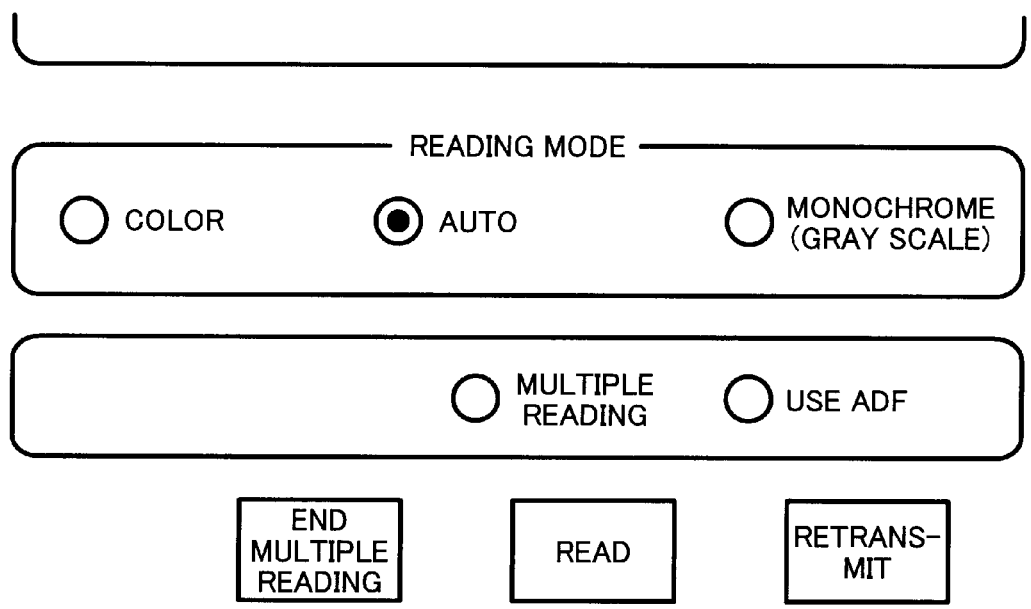
FIG. 9 is a plan view of a portion of a reading instruction input screen displayed on a display of a personal computer shown in FIG. 4.

FIG. 9 is a plan view of a portion of a reading instruction input screen displayed on the display of the PC to issue the "image reading and transmitting command" to the system controller 31a. The choices "Color", "Auto", and "Monochrome", are provided within the "Reading Mode" frame in FIG. 9, and any of these choices may be designated selectively by a keyboard or a mouse. A state in which "Auto" is selected is shown in FIG. 9. The default selection designation is "Auto". "Multiple reading" in the frame below the "Reading Mode" frame designates that the reading (reading by the flat-head arrangement) of a document sheet or book placed on the contact glass 231 is to be performed not just once (for one page) but is to be performed for one set of documents while manual changing of pages by the user and pressing of a start key are repeated. After the reading task is started, the image data of the respective pages are written into the same image files until the user clicks "End multiple reading". "Use ADF" restricts document reading to the ADF 230, and when this is designated, the entirety of the documents set in the ADF 230 are read continuously and the image data of the respective pages are written into the same image file.

When the user sets a document on the color document scanner 210 (including the ADF 230), designates a reading mode, designates "Multiple reading" or "Use ADF", and clicks the "Read" key, the PC generates and sends the "image reading and transmitting" command to the system controller 31a. In response to the command, the system controller 31a starts document reading, and when the system controller 31a transmits the image data to the PC as shown in FIG. 8, the user can open up and display the read image on the display of the PC. In opening up and displaying the read image, the PC performs character display of the attached judgment result (color/monochrome) on the same screen.

Here, if the image is displayed in gray scale and the user is not satisfied with the gray scale display, the user can close the image display, return to the reading instruction input screen shown in FIG. 9, designate the "Color" reading mode, and press the "Retransmit" key. The PC then sends the retransmitting command to the system controller 31a. In response, the system controller 31a executes steps 15 and 16 of FIG. 8, and transmits the image data in the color image file generated in the HDD to the PC.

With the above arrangement, when the user mistakes the reading mode designation on the PC or wants to change the reading mode upon viewing the image display, the image data of the designated reading mode are sent immediately without the reading of the document being performed again. Because the automatic judgment result of "Color" or "Monochrome" is displayed on the image display screen of the PC display, the user can reference this to determine an appropriate "Reading Mode".

Second Embodiment

Though a second embodiment is the same in hardware as the first embodiment, with the second embodiment, the "read image transmission control" (31ap) of the system controller 31a differs slightly in details from that of the first embodiment.

Figure 10:
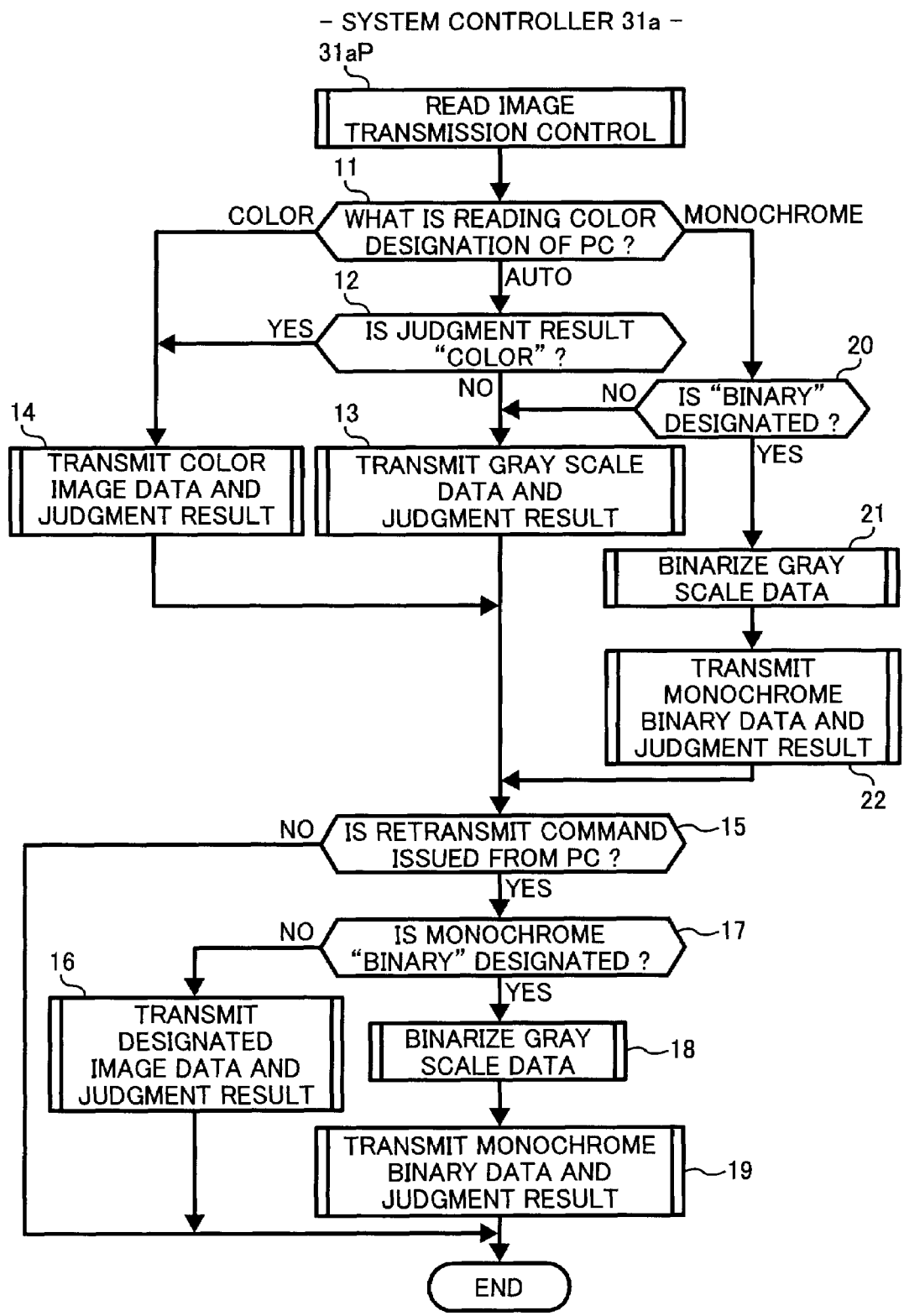
FIG. 10 is a flowchart of transmission control carried out when a system controller according to a second embodiment reads an image and performs transmission to a personal computer.
Figure 11:
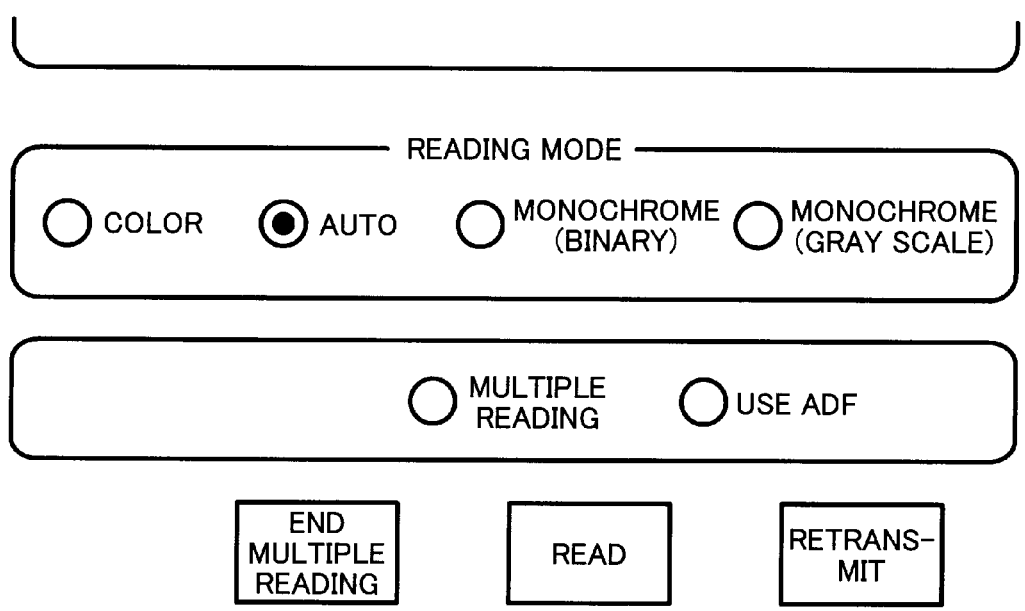
FIG. 11 is a plan view of a portion of a reading instruction input screen displayed on a display of a personal computer that instructs the system controller of the second embodiment to perform image reading and transmission.

The details of the "read image transmission control" (31ap), executed by the system controller 31a of the second embodiment, are shown in FIG. 10. With the second embodiment, there are two types of "monochrome" in the reading modes designated by the PC, that is, monochrome (binary; for example, a document prepared by a word processor) and monochrome (gray scale; for example, a black-and-white photograph). That is, in addition to the "Color", "Auto", and "Monochrome (gray scale)" in the "Reading Mode" frame of the reading instruction input screen displayed on the PC display, "Monochrome (binary)" is provided as shown in FIG. 11, and any one of these choices can be selectively designated by the keyboard or the mouse. The "image reading and transmitting command" that the PC provides to the system controller 31a may thus designate "monochrome (binary)". However, because the IPP of the second embodiment is the same as the IPP of the first embodiment shown in FIG. 6, and gray scale image data (monochrome multivalue data) are output by the monochrome image correcting process 50 when "monochrome (binary)" is designated, binarization of gray scale image data must be performed.

Referring again to FIG. 10, the system controller 31a of the second embodiment references the reading mode designation in the "image reading and transmitting command" received initially from the PC, and if the designation is "auto", the system controller 31a references, for each page of the two image files generated in the HDD, the judgment result data stored in correspondence to the page. Then using the IMAC, the system controller 31a extracts the corresponding page from the color image file if the judgment result for the page is "color" or extracts the corresponding page from the gray scale image file if the judgment result for the page is "monochrome". The system controller 31a then attaches the judgment result for each page and thereafter transmits the data to the PC (12 to 14).

If the reading mode designation in the "image reading and transmitting command" received initially from the PC is "monochrome (gray scale)", the system controller 31a transmits the image data of each page in the gray scale image file generated in the HDD and transmits the data to the PC upon attaching the judgment result (11-20-13). If the reading mode designation in the "image reading and transmitting command" received initially from the PC is "color", the system controller 31a transmits the image data of each page in the color image file generated in the HDD and transmits the data to the PC upon attaching the judgment result (14 directly from 11). If the reading mode designation in the "image reading and transmitting command" is "monochrome (binary)", the system controller 31a binarizes the monochrome multivalue image data in the gray scale image file in the HDD using a binarization function (not shown) of the IPP that is used in an image quality process for printer output (20, 21) and transmits the data to the PC upon attaching the judgment result (22). If after such transmission, a retransmitting command is received from the same PC without there being any instruction for another task, the system controller 31a transmits to the PC the image data of the corresponding pages in the two image files, stored in the HDD, or the monochrome binarized data upon attaching the judgment result according to the reading mode designation contained in the retransmitting command (16 to 19). The details of the steps 16 to 19 are the same as the details of the steps 11 to 14 and 20 to 22. Other functions of the second embodiment are the same as those of the first embodiment.

Third Embodiment

Figure 12:
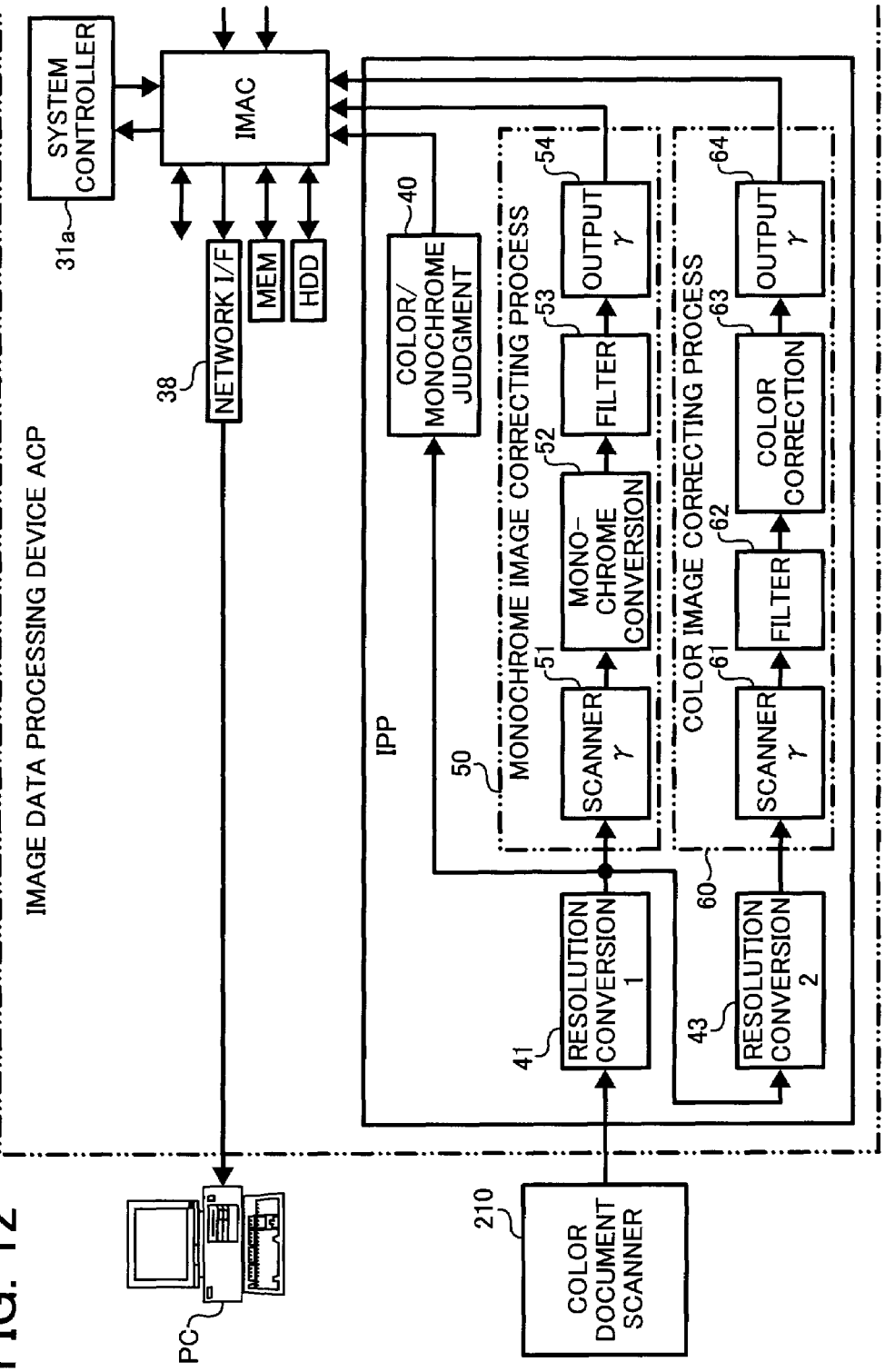
FIG. 12 is a block diagram of scanner image processing functions of an image data processing device according to a third embodiment.

The scanner image processing function of the IPP of the third embodiment that is used in transmitting image data, read from a document, to a PC is shown in FIG. 12. The scanner image processing function differs slightly from that of the first embodiment shown in FIG. 6. It is rare for the resolutions required by users to be such that the respective resolutions for color and monochrome differ in a completely unrelated manner, and in many cases, the resolutions are of a combination, such as 300 dpi for monochrome and 150 dpi for color. In such a case, by performing resolution conversions in tandem, that is, by subjecting RGB image data to resolution conversion by the first resolution conversion 41 and then subjecting the converted data to further resolution conversion by the second resolution conversion 43 as shown in FIG. 12, the function of the second resolution conversion 43 can be achieved adequately by a simple circuit for pixel skipping, etc. The resolution conversion functions as a whole can thereby be simplified.

By the first resolution conversion 41 shown in FIG. 12, RGB image data generated by the color document scanner 210 are converted in resolution to 300 dpi, and by the second resolution conversion 43, the RGB image data of 300 dpi is converted in resolution to 150 dpi by pixel skipping. The details of the "read image transmission control" (31ap) of the system controller 31a of the third embodiment may be the same as those of the first embodiment shown in FIG. 8, or the second embodiment shown in FIG. 10. Other hardware and functions of the third embodiment are the same as those of the first embodiment.

Fourth Embodiment

Figure 13:
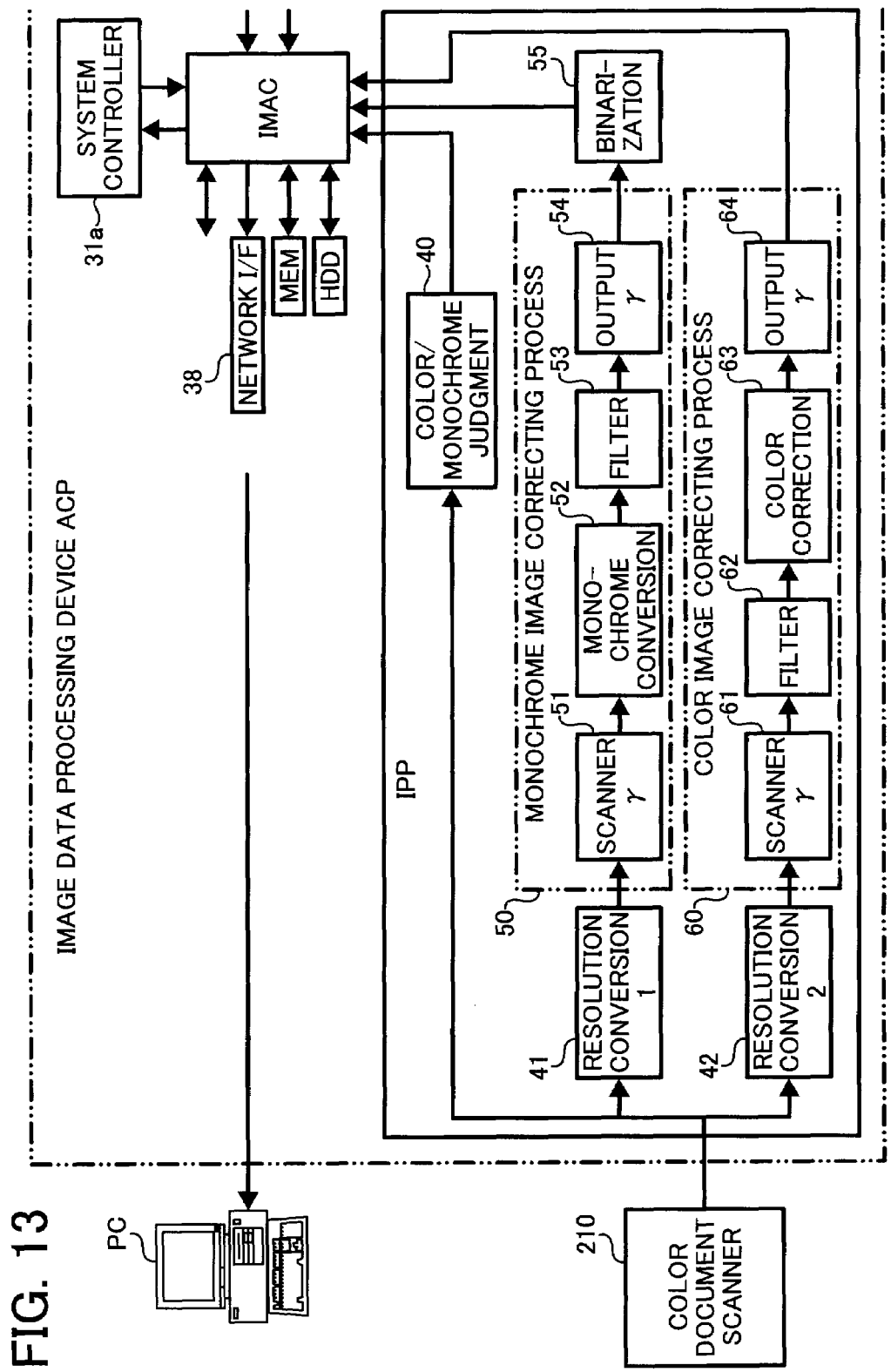
FIG. 13 is a block diagram of scanner image processing function of an image data processing device, according to a fourth embodiment.

The scanner image processing function of the IPP of the fourth embodiment that is used in transmitting image data, read from a document, to a PC is shown in FIG. 13. With the scanner image processing function of the IPP of the fourth embodiment, a binarization 55, by which gray scale image data are binarized and converted to "monochrome (binary)" data, is added to the scanner image processing functions of the IPP of the first embodiment shown in FIG. 6. The gray scale image data, generated by the monochrome image correcting process 50, are converted by the binarization 55 to monochrome binary image data and then sent to the IMAC.

The IMAC generates a monochrome binary image file in a storage area of the HDD and writes the monochrome binary image data into the image file.

Figure 14:
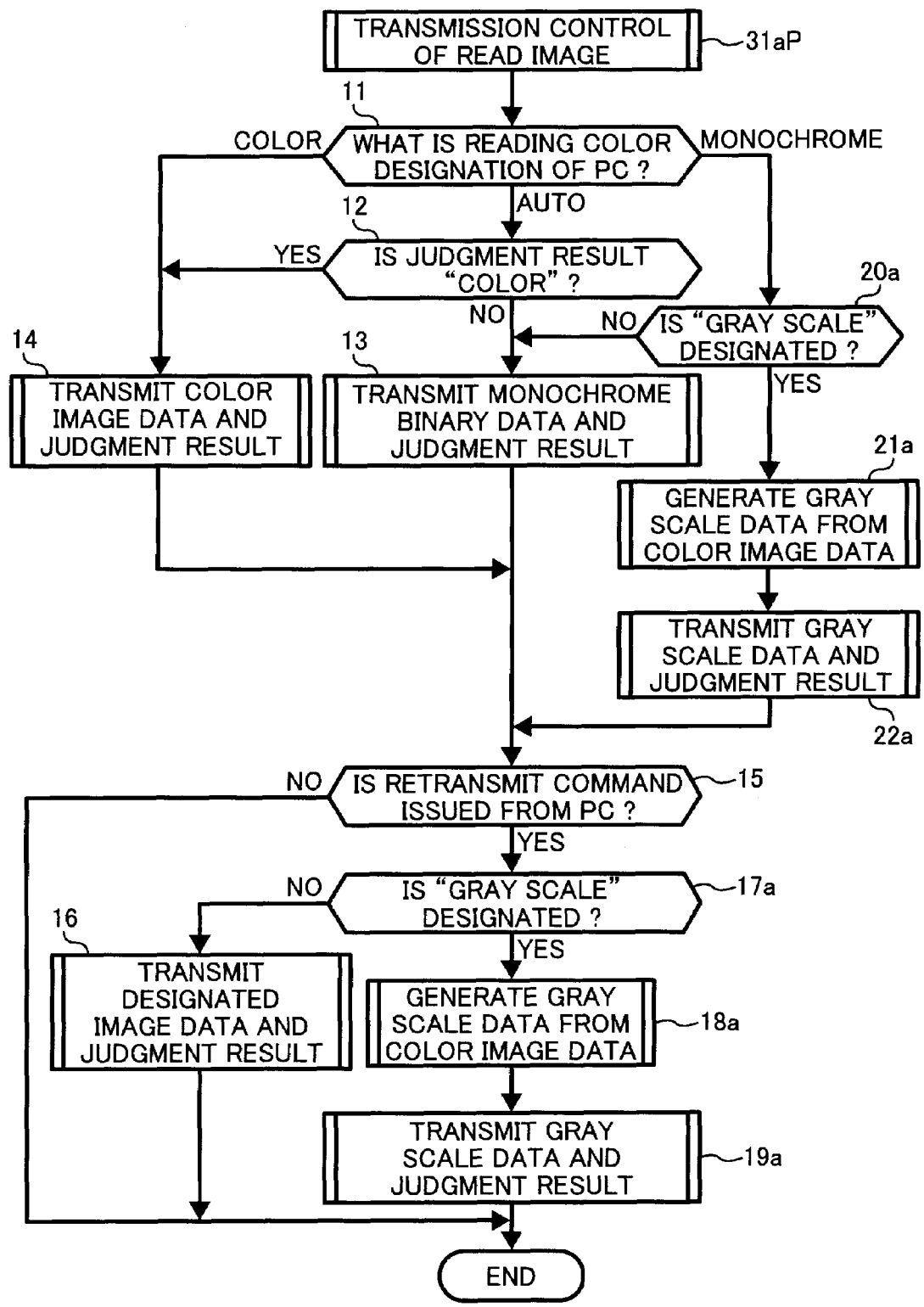
FIG. 14 is a plan view of a portion of a reading instruction input screen displayed on a display of a personal computer that instructs the system controller according to the fourth embodiment to perform image reading and transmission.

The details of the "read image transmission control" (31*ap*), executed by the system controller 31*a* of the fourth embodiment, are shown in FIG. 14. There are two types of "monochrome" in the reading modes designated by the PC, that is, monochrome (binary) and monochrome (gray scale) with the fourth embodiment as well. That is, in addition to the "Color", "Auto", and "Monochrome (binary)" in the "Reading Mode" frame of the reading instruction input screen displayed on the PC display, "Monochrome (gray scale)" is provided as shown in FIG. 11, and any one of these choices can be selectively designated by the keyboard or the mouse. The "image reading and transmitting command" that the PC provides to the system controller 31*a* may thus designate "monochrome (gray scale)". However, because the IPP of the fourth embodiment converts gray scale image data to monochrome (binary) data by the binarization 55, when "Monochrome (gray scale)" image data are required, the RGB image data in the color image file stored in the HDD must be converted to monochrome multivalue data, that is, gray scale data.

Referring again to FIG. 14, the system controller 31*a* of the fourth embodiment references the reading mode designation in the "image reading and transmitting command" received initially from the PC, and if the designation is "auto", references, for each page of the two image files generated in the HDD, the judgment result data stored in correspondence to the page. Then using the IMAC, the system controller 31*a* extracts the corresponding page from the color image file if the judgment result for the page is "color" or extracts the corresponding page from the monochrome binary image file if the judgment result for the page is "monochrome". The system controller 31*a* then stores each page image in the transmission file upon attaching the judgment result, and then transmits the transmission file to the PC (12 to 14).

If the reading mode designation in the "image reading and transmitting command" received initially from the PC is "monochrome (binary)", the system controller 31*a* transmits the image data of each page in the monochrome binary image file generated in the HDD and transmits the data to the PC upon attaching the judgment result (11-20*a*-13). If the reading mode designation in the "image reading and transmitting command" received initially from the PC is "color", the system controller 31*a* transmits the image data of each page in the color image file generated in the HDD and transmits the data to the PC upon attaching the judgment result (14 directly from 11). If the reading mode designation in the "image reading and transmitting command" is "monochrome (gray scale)", the system controller 31*a* converts the RGB image data in the color image file stored in the HDD to gray scale image data by the monochrome conversion 52 of the IPP (20*a*, 21*a*) and transmits the data to the PC upon attaching the judgment result (22*a*). If after such transmission, a retransmitting command is received from the same PC without there being any instruction for another task, the system controller 31*a* transmits to the PC the image data of the corresponding pages in the two image files, stored in the HDD, or the gray scale image data upon attaching the judgment result according to the reading mode designation contained in the retransmitting command (16 to 19*a*). The details of the steps 16 to 19*a* are the same as the details of the steps 11 to 14 and 20*a* to 22*a*. Other functions of the fourth embodiment are the same as those of the second embodiment.

Thus, according to the present invention, the external device can rapidly obtain the appropriately processed image data from the image data processing device.

Moreover, the color image data and the monochrome image data can be obtained at separate resolutions that are reasonable.

Furthermore, simple resolution conversion, by pixel skipping or insertion, is possible.

Moreover, a user of the external device can designate "color", "monochrome", or "auto" to obtain image data of the desired type, and the type of image data suited to the image can be obtained.

Furthermore, it is possible to binarize monochrome image data and transmit it.

Moreover, if the external device designates "monochrome (gray scale)", it is possible to convert stored color image data into monochrome gray scale data quickly, for transmission.

Furthermore, the user can know whether the input image is color or monochrome.

Moreover, the document image can be retransmitted at the user's request, without reading the document again.

According to another aspect of the present invention, the external device can obtain appropriately processed image data from the image processing device.

Moreover, image data suited to the type (color or monochrome) of the image of the read document can be sent to the external device immediately after the document reading process is complete.

Furthermore, not only images of separate sheets of documents, but also images of books can be read and sent to the external device.

Moreover, for reading multiple document, document images of multiple pages are handled as a single file at the external device, thereby simplifying the organization of images of a single group of documents at the external device.

According to still another aspect of the present invention, input image data is converted to image data of suitable type (color or monochrome), transmitted to the external device, and can be printed on paper by a printer.

According to still another aspect of the present invention, the color component image data generated by the image pickup unit can be converted to image data of a suitable image type (color/monochrome), transmitted to the external device, and can be printed on paper by a printer.

According to still another aspect of the present invention, in an image transmitting system, a document image can be read, corrected or converted to a suitable image type (color/monochrome), and sent via a communications medium to an external device by a multifunction image forming device. Also drawing information can be received from the external device and printed or copied by the multifunction image forming device.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image data processing device, comprising:
   a color processor that performs a color image correcting process on input color image data;
   a monochrome processor that performs a monochrome image converting process on the input color image data to convert the input color image data to monochrome image data, in parallel with the color image correcting process;

a color/monochrome judging unit that judges, in parallel with the color image correcting process, whether an image expressed by the input color image data is a color image or a monochrome image, thereby generating a judgment result;

a storage unit that stores the color image data processed by the color processor and the monochrome image data output by the monochrome processor and the judgment result of the color/monochrome judging unit;

a communicating unit that sends and receives commands and drawing information to and from an external device;

a transmitting unit that transmits any one of the color image data and the monochrome image data after being stored, to the external device via the communicating unit based on the judgment result of the color/monochrome judging unit stored in the storage unit;

a first resolution converting unit that performs a first resolution conversion on the input color image data and provides converted color image data to the monochrome processor; and a second resolution converting unit that performs second resolution conversion on the input color image data and provides the converted color image data to the color processor.

2. The image data processing device according to claim 1, wherein the second resolution converting unit performs the second resolution conversion of those color image data, which have undergone the first resolution conversion.

3. The image data processing device according to claim 2, wherein the second resolution converting unit performs the second resolution conversion by converting the resolution to a low resolution by pixel skipping.

4. An image data processing device, comprising:

a color processor that performs a color image correcting process on input color image data;

a monochrome processor that performs a monochrome image converting process on the input color image data to convert the input color image data to monochrome image data, in parallel with the color image correcting process;

a color/monochrome judging unit that judges, in parallel with the color image correcting process, whether an image expressed by the input color image data is a color image or a monochrome image, thereby generating a judgment result;

a storage unit that stores the color image data processed by the color processor and the monochrome image data output by the monochrome processor and the judgment result of the color/monochrome judging unit; and a communicating unit that sends and receives commands and drawing information to and from an external device;

a transmitting unit that transmits any one of the color image data and the monochrome image data after being stored, to the external device via the communicating unit based on the judgment result of the color/monochrome judging unit stored in the storage unit, wherein the external device sends to the transmitting unit, a resend request including a designated reading mode, and the transmitting unit, in response to the resend request and based on the image data stored in the storage unit, transmits image data, and an image data of a type corresponding to the designated reading mode.

5. An image transmitting system comprising:

a multifunction image forming device, including a color document scanner, a storage unit that stores image data, a color printer, a reading correcting unit that applies a reading correction to the image data generated by the color document scanner, an image quality correcting unit that converts the image data after the reading correction, to printer-compatible color image data to be printed out by the color printer, an image data transmitting bus, a control unit that controls flow of the image data from the color document scanner to the reading correcting unit and to the image data transmitting bus, and flow of the image data from the image data transmitting bus to the image quality correcting unit and to the color printer, a communicating unit that communicates with an external device, a read/write controlling unit that controls flow of the image data between the image data transmitting bus and the storage unit and, upon storing drawing information obtained from the external device via the communicating unit in the storage unit, makes the color printer print out the drawing information, and a sending unit that sends the drawing information in the storage unit to the external device via the communicating unit;

a communications medium that is any one of a communications line, a telecommunications line, and a network through which the communicating unit communicates with the external device; and the external device that communicates with the multifunction image forming device via the communications medium; and wherein the image transmitting system exchanges the drawing information between the external device and the multifunction image forming device; wherein the external device includes an input unit, using which a user designates an image type from among "color", "auto", and "monochrome", and instructs the multifunction image forming device, via the communications medium, to read and transmit an image of the image type designated by the user; and, in response to the instruction, the multifunction image forming device uses the color document scanner to read a document image, uses the reading correcting unit to perform a color image correcting process on color image data generated by the color document scanner, perform, in parallel to the color image correcting process, a monochrome image converting process on the color image data generated by the color image scanner to convert the color image data to monochrome image data, and judge, in parallel to the color image correcting process, whether an image expressed by the color image data generated by the color document scanner is a color image or a monochrome image, uses the read/write controlling unit to store the color image data, resulting from the color image correcting process, and the monochrome image data, resulting from the monochrome image converting process, in the storage unit, and after storing, transmits the color image data stored in the storage unit to the external device via the communicating unit if the designated image type is "color", transmits the monochrome image data stored in the storage unit to the external device if the designated image type is "monochrome", and if the designated image type is "auto", transmits the color image data to the external device if the color/monochrome judgment result is "color" and transmits the monochrome image data to the external device if the judgment result is "monochrome".

6. The image transmitting system according to claim 5, wherein
the reading correcting unit converts the color image data generated by the color document scanner to color image data of a first resolution, and then further converts the data to color image data of a second resolution, performs the monochrome image converting process on the color image data of the first resolution to convert the data to monochrome image data, and performs the color image correcting process on the color image data of the second resolution.

7. The image transmitting system according to claim 6, wherein
the reading correcting unit performs the conversion to the color image data of the second resolution by converting the color image data of the first resolution to a low resolution by pixel skipping.

8. The image transmitting system according to claim 6, wherein the first resolution is more than the second resolution.

* * * * *